United States Patent [19]

Bovenkerk

[11] Patent Number: 5,266,236
[45] Date of Patent: Nov. 30, 1993

[54] THERMALLY STABLE DENSE ELECTRICALLY CONDUCTIVE DIAMOND COMPACTS

[75] Inventor: Harold P. Bovenkerk, Worthington, Ohio

[73] Assignee: General Electric Company, Worthington, Ohio

[21] Appl. No.: 773,461

[22] Filed: Oct. 9, 1991

[51] Int. Cl.$^5$ .............................................. H01B 1/04
[52] U.S. Cl. .................................... 252/503; 51/309; 252/506
[58] Field of Search ................. 51/309; 252/503, 504, 252/506, 502

[56] References Cited

U.S. PATENT DOCUMENTS

| | | | |
|---|---|---|---|
| 3,913,280 | 10/1975 | Hall | 51/307 |
| 4,167,399 | 9/1979 | Lee et al. | 51/307 |
| 4,874,398 | 10/1989 | Ringwood | 51/293 |
| 4,907,377 | 3/1990 | Csillag et al. | 51/309 |
| 5,030,596 | 7/1991 | Kume et al. | 501/90 |

*Primary Examiner*—Mark L. Bell
*Assistant Examiner*—Chris Gallo

[57] ABSTRACT

Broadly, the present invention is directed to a method for making a thermally stable, dense, electrically conductive diamond compact. The method comprises infiltrating a mass of diamond crystals with a silicon infiltrant in the presence of boron under conditions comprising a temperature of not substantially above 1200° C. and a pressure of not substantially above 45 Kbars. The resulting compact contains diamond-to-diamond bonding. The boron can be provided in the form of boron-doped diamond. Alternatively, a boron-silicon alloy can be used for infiltrating boron-doped or undoped diamond. Further, boron can be added as elemental boron or $B_4C$ with silicon for infiltration. Alternatively, boron metal catalyst plus silicon infiltration can be used for boron-doped or undoped diamond. Combinations of these techniques also can be used. In the HP/HT process, the silicon infiltrates the diamond powder mass forming a network composed of silicon carbide by reaction of the silicon with diamond-carbon. The reaction leaves a sintered body composed of boron-doped diamond or boron compounds with diamond or a network of silicon carbide and silicon.

13 Claims, No Drawings

THERMALLY STABLE DENSE ELECTRICALLY CONDUCTIVE DIAMOND COMPACTS

BACKGROUND OF THE INVENTION

The present invention relates to thermally-stable diamond compacts and more particularly to the production of thermally stable, dense, electrically conductive diamond compacts.

Well-known in the superabrasive art are compacts of polycrystalline abrasive particles typified by polycrystalline diamond and polycrystalline cubic boron nitride (CBN) compacts. Such compacts are represented by U.S. Pat. Nos. 3,745,623 and 3,608,818 with respect to polycrystalline diamond compacts and U.S. Pat. Nos. 3,767,371 and 3,743,489 with respect to polycrystalline CBN compacts. While such polycrystalline compacts represent a significant contribution to the art and many fields of use, thermal degradation at an elevated temperature, e.g. above about 700° C., limited their usefulness, especially in metal matrix bond applications. Thermal stability of such polycrystalline compacts was improved with the advent of thermally-stable, porous self-bonded polycrystalline diamond and CBN compacts containing less than 3% non-diamond phase, hereinafter termed "porous compacts". Compacts of this type are the subject of U.S. Pat. Nos. 4,224,380 and 4,288,248.

European patent publication No. 116,403 describes a thermally-stable diamond compact comprising a mass of diamond particles present in an amount of 80% to 90% by volume of the compact and a second phase present in an amount of 10% to 20% by volume of the compact, the mass of diamond particles containing substantially diamond-to-diamond bonding to form a coherent skeletal mass and the second phase containing nickel and silicon, the nickel being in the form of nickel and/or nickel silicide and the silicon being in the form of silicon, silicon carbide, and/or nickel silicide. British Patent Application No. 8,508,295 describes a thermally-stable diamond compact comprising a mass of diamond particles present in an amount of 80% to 90% by volume of the compact and the second phase present in an amount of 10% to 20% by volume of the compact, the mass of diamond particles containing substantially diamond-to-diamond bonding to form a coherent skeletal mass and a second phase consisting of silicon, the silicon being in the form of silicon and/or silicon carbide.

Silicon-bonded polycrystalline diamond compacts also have been formed by a process which utilizes a partial vacuum for infiltrating fluid silicon into a mass of discrete diamond or CBN crystals, as disclosed in U.S. Pat. No. 4,224,455. Somewhat similar processes are disclosed in U.S. Pat. Nos. 4,238,433 and 4,242,106. An improvement to such fabrication technique is disclosed in U.S. Pat. No. 4,381,271 wherein a substantially uniform mixture of diamond or CBN crystals and fibrous graphite are infiltrated with fluid silicon under a particle vacuum under a temperature above 1004° C., wherein the fibrous graphite has been subjected to a heat treatment operation under vacuum at a temperature of between about 800° and 1700° C.

Despite the thermal stability achieved by porous compacts and silicon-infiltrated compacts, neither product can be cut or shaped except by laser burning. Laser burning does not give the edge quality needed for many applications and laser burning equipment is not readily available to tool makers.

BROAD STATEMENT OF THE INVENTION

Broadly, the present invention is directed to a method for making a thermally stable, dense, electrically conductive diamond compact. The method comprises infiltrating a mass of diamond crystals with a silicon infiltrant in the presence of boron under conditions comprising a temperature of not substantially above 1200° C. and a pressure of not substantially above 45 Kbars. The resulting compact contains diamond-to-diamond bonding. The boron can be provided in the form of boron-doped diamond. Alternatively, a boron-silicon alloy can be used for infiltrating boron-doped or undoped diamond. Further, boron can be added as elemental boron or $B_4C$ with silicon for infiltration. Alternatively, boron metal catalyst plus silicon infiltration can be used for boron-doped or undoped diamond. Combinations of these techniques also can be used.

In the HP/HT process, the silicon infiltrates the diamond powder mass forming a network composed of silicon carbide by reaction of the silicon with diamond-carbon. The reaction leaves a sintered body composed of boron-doped diamond or boron compounds with diamond or a network of silicon carbide and silicon.

Advantages of the present invention include reduced process conditions of pressure and temperature leading to lower costs. Another advantage is a compact which can be easily shaped using plunge or electrodischarge grinding (EDG) or wire electrodischarge machining (EDM) techniques. Another advantage is that the inventive compact exhibits increased oxidation resistance as imparted by the boron content. These and other advantages will be readily apparent to those skilled in the art based upon the disclosure contained herein.

DETAILED DESCRIPTION OF THE INVENTION

In the inventive process disclosed herein, a mass of diamond particles is enclosed in a refractory metal or getter metal container along with a source of silicon which conveniently will be a thin disk, though particulate silicon could be used. If the starting diamond powder is boron doped, it is prepared beforehand. Known processes for making boron-doped diamond include starting with boron-containing graphite, starting with boron-containing catalyst, adding boron elemental or combined form to the diamond making process, or by making the diamond in a boron-containing container, such as borosilicate glass or boron metal alloy. In this regard, reference is made to the following citations: U.S. Pat. Nos. 4,268,276, 3,136,615, and 3,148,161, the disclosures of which is expressly incorporated herein by reference.

Alternatively, the boron-doped diamond could be made by chemical vapor deposition (CVD) or like low pressure processes by adding boron-containing species to the gas streams. CVD techniques are well known and generally involve the use of a dilute mixture of hydrocarbon gas and hydrogen wherein the gas is introduced to be a quartz tube located just above a hot tungsten filament which is electrically heated to a temperature ranging from between about 1750° to 2400° C. The gas mixture disassociates at the filament surface and diamonds are condensed onto a heated substrate placed just below the hot tungsten filament. The substrate is held in a resistance heated boat and heated to a temperature in the region of about 500° to 1100° C. The gaseous mixture partial decomposition also can be conducted with the assistance of d.c. discharge or radiofrequency electromagnetic radiation to generate a plasma. This technique has been used in the semi-conductor area to dope polycrystalline CVD diamond with boron, aluminum, lithium, phosphorous, or the like. Thus, the preparation of boron doped CVD diamond is known to those skilled in this art field.

The diamond powder subjected to the silicon infiltration process, whether boron doped or not, can have additional boron added as a phase of the compact, e.g. to impart electrical conductivity. Boron powder homogeneously admixed with the diamond powder is a convenient means for carrying out this embodiment of the present invention.

Silicon or silicon-boron alloy or silicon-boron mixtures melt and infiltrate the powdered diamond mass reacting with the diamond-carbon to form a network of diamond bonded to silicon carbide. Depending upon the time and temperature of the reaction, the degree of silicon carbide formation may be complete or incomplete. If silicon carbide formation is incomplete, a silicon or silicon boron alloy will be present. If the diamond is undoped, some diffusion doping of the diamond also should occur during the process.

Reacting diamond with silicon at high pressures and high temperatures does lead to some diamond-to-diamond bonding, but the mechanism of this process is not understood. Since a high degree of diamond-to-diamond bonding is desired for maximum wear and fracture strength, enhancement of this phenomena can be achieved by adding a small amount (e.g. about 0.1 to 3 wt. %) of diamond-making catalyst, e.g. iron, cobalt, or nickel. Preferably, these catalytic materials should be added as alloys with boron, or as Fe-Ni-B or Co-Ni-B alloys, or the like.

It is well known that silicon melts at about 1400° C. at 1 atmosphere, and that application of pressure reduces the melting point substantially, e.g. by at least 300° C. at 50 Kbar. The same phenomenon occurs for boron. Thus, an Si-B alloy also would most probably have its liquidus temperature reduced by pressure. It is known from the phase diagram of Si-B alloys that B dissolves substantially in Si with lattice-parameter contraction. With respect to B-Co and B-Ni phase diagrams, adding B depresses the liquidus temperature for these metals to a substantial degree also.

On the basis of the melting points and reaction kinetics, the maximum degree of diamond-to-diamond bonding is desired, and optimal temperature for sintering would be around 1100° C. to 1200° C. This would require pressures of about 45 Kbar if in the diamond stable region, or less than 45 Kbar if lower diamond-to-diamond bonding is to be achieved.

In contrast, normal polycrystalline diamond (PCD) is made at 1300° to 1500° C. at pressures of about 45 to 60 Kbar. The lower pressures and temperatures required for the inventive process would provide extended tooling life for a diamond making high pressure apparatus and, therefore, would substantially reduce production costs. The lower temperatures also would allow large pieces to be made in a given HP/HT apparatus as less thermal insulation would be required.

In practicing the present invention, the use of HP/HT equipment is known in the art, such as illustrated in the Background section set forth above. The diamond particles subjected to the process generally will range in size from about 0.1 to 100 microns in average particle size. The diamond crystals, undoped or doped with boron, optionally admixed with additional boron-containing material, then has a source of silicon infiltrant placed adjacent thereto and the entire assembly placed in an HP/HT apparatus which is subjected to temperatures not substantially above about 1200° C. and a pressure of not substantially above about 45 Kbars, depending upon the degree of diamond-to-diamond bonding required. The amount of silicon or silicon alloy (e.g. SiC) generally can range from about 5 to 30 wt. %.

Thereafter, the resulting compact is removed from the press, cleaned, and subjected to finishing operations. The novel compact is electrically conductive which means that machine tool fabricators can utilize conventional EDM wire and plunge or EDG for shaping the diamond compact into a useful tool form. The thermal stability of such form of compact already is documented in the literature, as described above.

I claim:

1. A method for making a thermally stable, dense, electrically conductive diamond compact, which comprises the step of:
    infiltrating a mass of diamond crystals with a silicon infiltrant in the presence of boron under conditions comprising a temperature of not substantially above about 1,200° C. and a pressure of not substantially above about 45 kbars, the resulting compact containing diamond-to-diamond bonding.

2. The method of claim 1 wherein said diamond crystals comprise boron-doped diamond crystals.

3. The method of claim 1 wherein said infiltrant comprises a silicon boron alloy or silicon boron mixture.

4. The method of claim 1 wherein said diamond crystals are admixed with a boron material.

5. The method of claim 1 wherein said temperature is between about 1100° and 1200° C.

6. The method of claim 1 wherein said infiltrating is conducted in the presence of a diamond-making catalyst.

7. The method of claim 6 wherein said diamond-making catalyst is one or more of iron, nickel, or cobalt.

8. The method of claim 7 wherein said infiltrant comprises a silicon alloy or mixture with one or more of iron, nickel, or cobalt.

9. The method of claim 1 wherein said diamond crystals range in size from about 0.1 to 100 microns, size selected or a mixture of sizes.

10. The method of claim 2 wherein said infiltrant comprises a silicon boron alloy or silicon boron mixture.

11. A thermally stable, dense, electrically conductive diamond compact consisting essentially of between about 70 and 95 wt. % of a mass of one or more of diamond crystals or boron-doped diamond crystals; between about 5 and 30 wt. % of Si; and boron in the form of one or more of boron-doped diamond crystals, elemental boron, or a boron alloy; and a diamond making catalyst selected from the group consisting of one or more of iron, nickel, or cobalt.

12. The compact of claim 11 wherein said diamond crystals comprise boron-doped diamond crystals.

13. The compact of claim 12 wherein said silicon is an alloy with one or more of iron, nickel, or cobalt.

* * * * *